Feb. 22, 1966 G. A. RUTAN 3,236,028
APPARATUS AND METHOD FOR DRYING A GASEOUS MEDIUM
Filed Jan. 3, 1963 2 Sheets-Sheet 1

INVENTOR.
GERALD A. RUTAN
BY
Kane, Dalsimer and Kane
ATTORNEYS

United States Patent Office 3,236,028
Patented Feb. 22, 1966

3,236,028
APPARATUS AND METHOD FOR DRYING A GASEOUS MEDIUM
Gerald A. Rutan, East Northport, N.Y., assignor to Puregas Equipment Corp., Copiague, N.Y., a corporation of New York
Filed Jan. 3, 1963, Ser. No. 249,192
7 Claims. (Cl. 55—33)

This invention relates to improved apparatus and methods for removing a contaminant from a gaseous medium and more particularly to apparatus for drying air and other gases.

It is an object of the present invention to provide improved apparatus of the above character of simplified, inexpensive and rugged constructioin which can be operated in a simple and efficient manner to remove contaminants such as water vapor from a gaseous medium.

The apparatus and method heretofore available for removing contaminants such as water vapor from a gaseous medium have had recognized disadvantages. Thus, some types of systems have been cumbersome and expensive and have provided duplicate adsorption chambers which are alternately operated with one chamber being used to absorb the contaminant from the gaseous medium while the other chamber is being reactivated. Other systems are operated periodically on a rather long cycle basis and for a portion of each cycle the apparatus must be shut down while the adsorbent material is reactivated. Other systems employ heat to help dry the air or to help reactivate the adsorbent material, and this adds to the expense of the original equipment and the cost of the operation thereof.

It is an object of the present invention to overcome the difficulties and advantages heretofore encountered and to provide an improved apparatus for removing a contaminant from a gaseous medium and more particularly improved apparatus for drying air and similar gases which does not require the use of heat or duplicate adsorption chambers; in which the operation does not have to be shut down for protracted periods for the reactivation of the adsorption medium, and which is of relatively simplified and inexpensive construction and can be operated in an efficient and simple manner to remove the selected contaminants from a gaseous medium.

My invention contemplates the provision of improved apparatus for removing a contaminant such as water vapor from a gaseous medium which operates on a pulsating basis and includes a compressor assembly for alternately increasing and decreasing the pressure of the gaseous medium. The compressor assembly is in the form of a piston and cylinder having a valve-controlled intake port for the gaseous medium to be treated and an opening through which the gaseous medium may flow in either direction while being treated and which communicates with a compression chamber. An adsorption agent is supported between the cylinder and the compression chamber so that the gaseous medium flowing through the opening in either direction must pass through the adsorption agent. An outlet port is also provided in the compression chamber and it is controlled by a pressure-operated valve so that gaseous medium may flow outwardly from the compression chamber when it has reached a predetermined pressure. When the piston shifts towards the cylinder head on the compression stroke, it causes the gaseous medium to be increased in pressure and to flow into the compression chamber through the opening and adsorption agent whereby contaminant is removed therefrom. When the predetermined pressure is reached in the compression chamber, a portion of the treated gaseous medium escapes through the outlet port and is suitably collected. When the piston moves away from the cylinder head on the expansion stroke, the pressure of the remaining gas in the compression chamber is reduced and it is caused to flow through the adsorption agent back into the cylinder thereby reactivating the adsorption agent. As the piston continues on its intake stroke, fresh gas to be treated is drawn into the cylinder through the intake port. An escape outlet passage is provided between the interior of the cylinder and the atmosphere so as to bleed off some of the gaseous medium in the cylinder and prevent undue concentration of contaminant.

Figure 1:
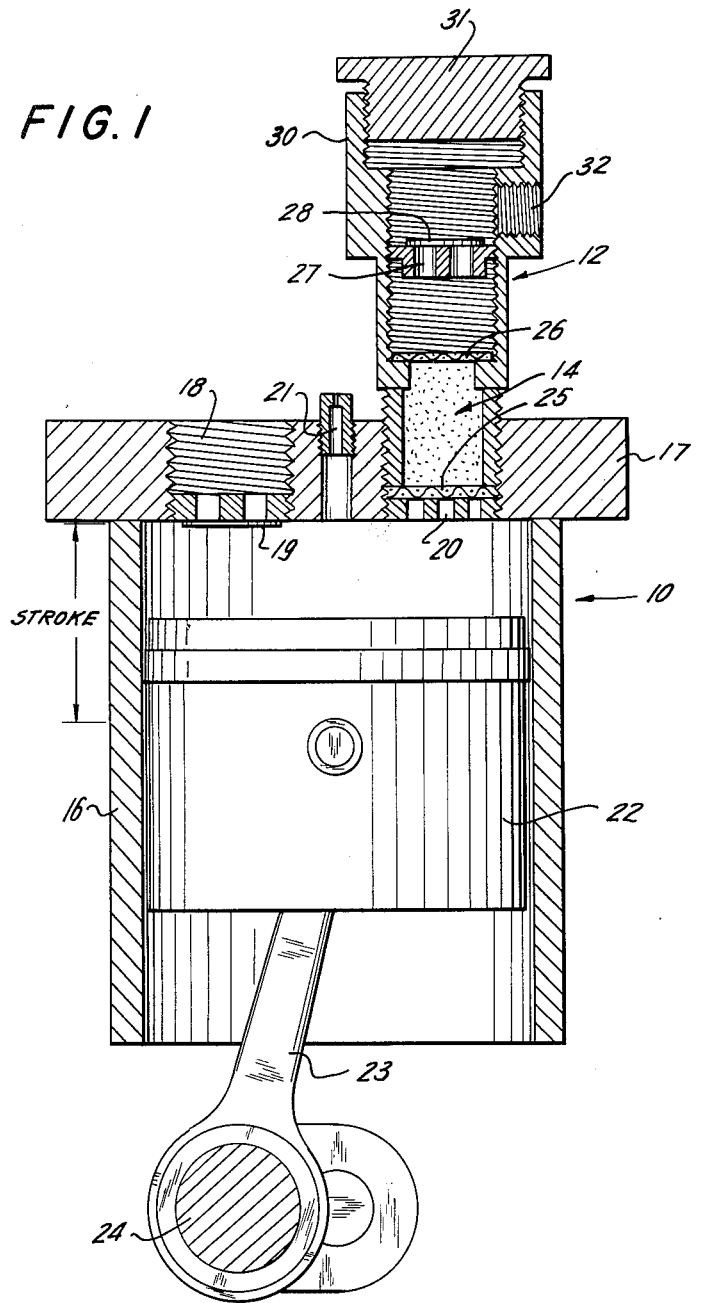
FIG. 1 is a longitudinal sectional view of apparatus embodying my invention showing the compressor assembly, the compression chamber and the various ports and openings.

My apparatus comprises a compressor assembly 10 and a compression chamber 12 having communication with each other through an adsorption chamber 14.

The illustrated compressor comprises a cylinder having a piston which reciprocates therein. The cylinder is shown at 16 and it is provided with a cylinder head 17 having an intake port 18 controlled by an intake check valve 19. The gaseous medium to be treated is drawn into the cylinder through the intake port 18. Thus, the intake port should have communication with a source of the gaseous medium to be treated. Where the gaseous medium is air, the port 18 can simply communicate with the atmosphere. Where another gaseous medium is to be treated, the port 18 can be connected by means of a suitable conduit to a source of supply of the gaseous medium.

The cylinder head is also provided with an outlet 20 through which the gaseous medium to be treated may pass in either direction between the cylinder and the compression chamber.

In addition, an escape outlet port 21 of relatively small size is formed in the cylinder head to permit the escape of a small portion of the gaseous medium to prevent an undue build-up of the contaminant as will be more fully explained.

The piston is shown at 22 and it is caused to reciprocate in the cylinder by suitable means such as the piston rod 23 connected to crank shaft 24 which, in turn, is suitably driven by a prime mover (not shown).

Disposed in the adsorption chamber 14 between the opening 20 and the compression chamber 12 is a suitable adsorption agent for the contaminant to be removed from the gaseous medium. Activated silica gel or alumina in granular or finely divided form serves very satisfactorily where water vapor is to be removed from the gaseous medium. Where other contaminants are to be removed from the gaseous medium, finely divided activated carbon or other specific adsorption agent may be employed. As shown, the adsorption chamber is filled with the finely divided adsorption agent. Between the opening 20 and the adsorption agent, I provide a screen and filter assembly 25 which serves to remove particulate contaminants from the gaseous medium and also serves to hold the adsorption agent in place. Also, between the compression chamber and the adsorption agent, I preferably provide a screen and filter assembly 26.

The compression chamber 12 is preferably substantially smaller than the displacement volume of the piston and cylinder assembly. In this connection, I have found that the compression chamber should be no more than approximately 25 percent of the displacement volume of the piston and cylinder assembly. The compression chamber is provided with an outlet port 27 near its upper end and the outlet port is controlled by a pressure-operated check valve 28. The pressure-operated valve 28 is adjusted so as to be operated only near the upper portion of the compression stroke of the piston and so that no more than approximately 50 percent of the compressed gas displaced from the cylinder escapes through the outlet port 27.

The fitting 30 disposed above the compression chamber is provided with a closure plug 31 which may be removed to provide access to the interior of the compression chamber and the adsorption chamber. The fitting is also provided with a side outlet 32 through which the treated gas escapes. The treated or dried gaseous medium may be suitably conducted from the outlet 32 to the point of use or to a storage chamber. In this connection, the gas may be further compressed for storage if desired.

In using my improved apparatus, a suitable adsorbent agent for the contaminant to be removed from the gaseous medium is placed in the absorbent chamber 14. Where the apparatus is used as an air dryer, activated silica gel or alumina in granular form is placed in the chamber between two screen and filter assemblies 25 and 26. The inlet port 18 is connected to a suitable source of supply of the gaseous medium to be treated and the outlet port 32 is connected either to the point of using the treated gaseous medium or to a storage chamber. In this connection, the apparatus may be used in connection with a closed system in which the gaseous medium is continuously recirculated. Thus, the decontaminated gas will flow out through outlet 32 to the point of use where it becomes contaminated and the contaminated gas is thereafter recycled through the intake port 18. If the apparatus is used simply for drying air, the port 18 may, under certain circumstances, simply communicate with the atmosphere.

Figure 2:
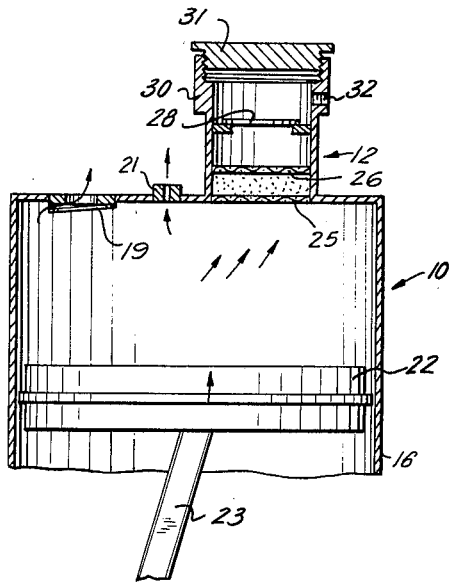
FIG. 2 is a diagrammatic view of the compression chamber and the upper portion of the compressor showing the beginning of the compression stroke.

FIGS. 2–5 illustrate one complete cycle of operation of my apparatus, and it will be assumed that the apparatus is being used for the drying of air. FIG. 2 illustrates the initiation of the compression stroke. A fresh supply of air has been drawn through the intake port 18 and valve 19 into the cylinder 16. As the intake stroke is initiated, the intake valve is still open and a small quantity of gaseous medium is expelled through the intake valve and a very small quantity of gaseous medium is continuously expelled through the outlet port 21. This port may be provided in the side wall of the cylinder if desired. Instead of or in addition to providing the outlet port 21, a leakage path may be provided between the piston and cylinder in order to permit a small quantity of the gaseous medium to escape from inside the system during the compression stroke. Under any circumstances, the leakage path provided by the intake valve at the initiation of the compression stroke and by the outlet port 21 or escape path between the piston and cylinder is very small compared to the total displacement of the piston and cylinder assembly and does not interfere with the development of sufficient compression in the gaseous medium.

During the compression stroke, the gaseous medium is compressed and the major portion thereof passes through the outlet port 20 and then through the filter and screen assemblies and the adsorption agent into the compression chamber 12. The gaseous medium which flows through the adsorption agent is substantially decontaminated. Thus, where air is being dried, the major portion of the water vapor is adsorbed by the silica gel, alumina or other adsorption agent. As the piston approaches the upper end of the compression stroke, the compression in the compression chamber is built up to a point where the check valve 28 opens and a portion of the treated gaseous medium passes through the outlet port 27, check valve 28 into the fitting 30 and thence out through outlet 32.

Figure 3:
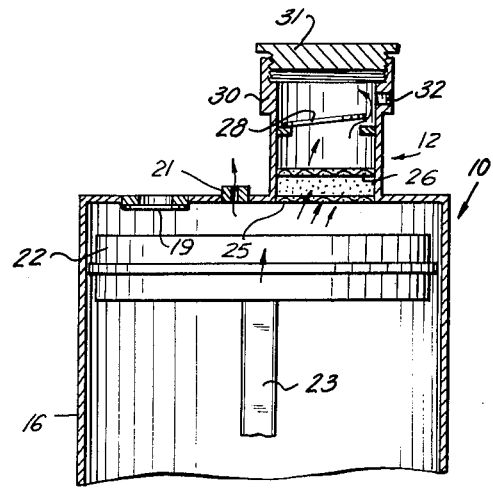
FIG. 3 is a similar view illustrating the end of the compression stroke.

FIG. 3 illustrates the terminal portion of the compression stroke and check valve 28 is open and compressed treated gas from the compression chamber escapes outwardly therethrough.

Figure 4:
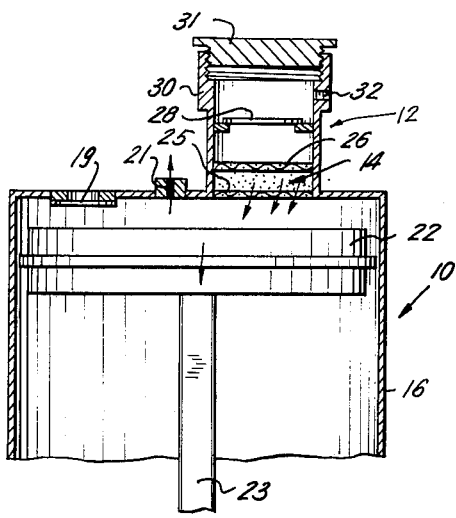
FIG. 4 is a similar view showing the beginning of the expansion stroke.

FIG. 4 illustrates the initiation of the expansion stroke. As the piston moves downwardly, the gaseous medium expands with the result that the pressure of the gaseous medium in the compression chamber drops and check valve 28 closes. As the gaseous medium expands, the gases inside the compression chamber flow downwardly through the screen and filter assemblies and the adsorption medium back into the cylinder. The gaseous medium flowing back from the compression chamber into the cylinder is at a reduced pressure with the result that the water vapor pressure is reduced to a pressure lower than it had been when it passed through on the decontaminating portion of the cycle. Therefore, it can pick up moisture absorbed by the adsorption agent and reactivate it.

Throughout the compression stroke and at the initiation of the expansion stroke the pressure inside the cylinder is higher than atmospheric with the result that a portion of the compressed gaseous medium is purged through the outlet port 21 in the cylinder head. Where a leakage path is provided between the piston and cylinder, a portion of the gaseous medium will escape therethrough to the atmosphere. This purging of the contaminated or moist gaseous medium from inside the cylinder prevents an undue build-up of moisture or other contaminant in the gaseous medium.

As the piston continues downwardly in the expansion stroke, the intake valve 19 opens permitting fresh gaseous medium to be treated to enter into the cylinder while more gaseous medium continues to flow from the compression chamber through the adsorption agent and back into the cylinder.

Figure 5:
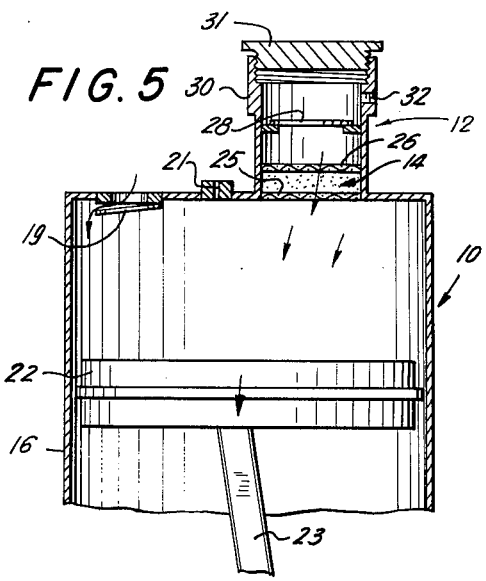
FIG. 5 is a similar view showing the end of the expansion stroke.

FIG. 5 illustrates the terminal portion of the expansion stroke. Throughout the expansion stroke treated gaseous medium in the compression chamber flows through the adsorption agent back into the cylinder with the result that the adsorption agent has been reactivated and is ready for the commencement of the compression stroke, as shown in FIG. 2.

It will thus be seen that I have provided an improved apparatus for use in removing a contaminant, such as water vapor, from a gaseous medium, such as air. The apparatus is of simplified, inexpensive yet rugged construction. It operates on a pulsating basis to provide a substantially continuous supply of decontaminated or dried gaseous medium.

Modifications may be made in the illustrated and described embodiment of my invention without departing from the invention as set forth in the accompanying claims.

I claim:

1. Apparatus for removing a contaminant from a gaseous medium in a continuously operating, pulsating, cyclical system comprising: a compressor assembly for increasing and decreasing the pressure of the gaseous medium and including a cylinder having a head and side walls and a piston within the cylinder, said cylinder being provided with a valve-controlled intake port for the gaseous medium to be treated and an opening through which the gaseous medium may flow in either direction while being treated, a compression chamber having communication with said opening in the cylinder, means for supporting an adsorption agent for the contaminant between said opening and said compression chamber so that the gaseous medium flowing through the opening in either direction must pass through the adsorption agent, and an outlet port in said compression chamber controlled by a pressure-operated valve so that gaseous medium may flow outwardly from said compression chamber when the gaseous medium therein has reached a predetermined pressure, said piston being shiftable within the cylinder towards the head on the compression stroke to cause gaseous medium being treated to be increased in pressure and to flow through the opening and adsorption agent so that the contaminant is removed therefrom and thence into the compression chamber from which a portion of the treated gaseous medium escapes through the outlet port when a predetermined pressure is reached and said piston being also shiftable away from the head on the expansion stroke to draw a portion of said treated gas at reduced pressure from the compression chamber back through the adsorption agent to reactivate it and also to draw more gaseous medium to be treated through the intake port, and said compressor assembly also including escape outlet passage means providing communication between the interior of the cylinder and the space outside the apparatus at least during the initial portion of the compression stroke to bleed off some of the gaseous medium in the cylinder and prevent undue concentration of contaminant.

2. Apparatus for removing a contaminant from a gaseous medium in a continuously operating, pulsating, cyclical system as set forth in claim 1 in which the compression chamber has no more than approximately 25 percent of the displacement volume of the cylinder.

3. Apparatus for removing a contaminant from a gaseous medium in a continuously operating, pulsating, cyclical system as set forth in claim 1 in which the escape outlet passage includes a small outlet port in the cylinder providing communication between the interior of the cylinder and the atmosphere.

4. Apparatus for removing a contaminant from a gaseous medium in a continuously operating, pulsating, cyclical system as set forth in claim 1 in which the escape outlet passage includes a leakage path between the piston and cylinder and also through the valve-controlled intake port of the cylinder.

5. Apparatus for drying a gaseous medium in a continuously operating, pulsating, cyclical system comprising: a compressor assembly for increasing and decreasing the pressure of the gaseous medium and including a cylinder having a head and side walls and a piston within the cylinder, said cylinder being provided with a valve-controlled intake port for the gaseous medium to be treated and an opening through which the gaseous medium may flow in either direction while being treated, a compression chamber having communication with said opening in the cylinder, means for supporting a water-adsorption agent between said opening and said compression chamber so that the gaseous medium flowing through the opening in either direction must pass through said water-adsorption agent, and an outlet port in said compression chamber controlled by a pressure-operated valve so that gaseous medium may flow outwardly from said compression chamber when the gaseous medium therein has reached a predetermined pressure, said piston being shiftable within the cylinder towards the head on the compression stroke to cause gaseous medium being treated to be increased in pressure and to flow through the opening and water-adsorption agent so that the moisture is removed therefrom and thence into the compression chamber from which a portion of the treated gaseous medium escapes through the outlet port when a predetermined pressure is reached and said piston being also shiftable away from the head on the expansion stroke to draw a portion of said treated gas at reduced pressure from the compression chamber back through the water-adsorption agent to reactivate it and also to draw more gaseous medium to be treated through the intake port, and said compressor assembly also including escape outlet passage means providing communication between the interior of the cylinder and the space outside the apparatus at least during the initial portion of the compression stroke to bleed off some of the gaseous medium in the cylinder and prevent undue concentration of the moisture content.

6. Apparatus for drying a gaseous medium in a continuously operating, pulsating, cyclical system as set forth in claim 5 in which the volume of the compression chamber is less than substantially 25 percent of the displacement volume of the cylinder.

7. The method of drying a gaseous medium in a continuously operating, pulsating, cyclical system which comprises: first compressing the gaseous medium in a cylinder and flowing it outwardly at the increased pressure through a water adsorption medium into a compression chamber so that water vapor is removed from the gaseous medium; then when the pressure of the gaseous medium in the compression chamber exceeds a predetermined level flowing a portion only of said dried gaseous medium out of said compression chamber; then reducing the pressure in said cylinder and flowing gaseous medium remaining in the compression chamber back through the adsorption medium into said cylinder at reduced pressure to reactivate the adsorption medium while simultaneously drawing untreated gaseous medium into said cylinder from another source; thereafter increasing the pressure of the mixed gaseous medium in the cylinder and purging a portion thereof out of the system while again flowing most of the mixed gaseous medium through the adsorption medium into the compression chamber; and continuously repeating the foregoing steps in a cyclical operation.

References Cited by the Examiner

UNITED STATES PATENTS 3,080,693   3/1963   Glass et al. _____ 55—62 X
3,121,625   2/1964   Broughton _____ 55—58

REUBEN FRIEDMAN, *Primary Examiner.*